UNITED STATES PATENT OFFICE 2,567,972

METHOD OF MAKING ALUMINUM-CONTAINING HYDRIDES

Hermann I. Schlesinger and Albert E. Finholt, Chicago, Ill.

No Drawing. Application December 19, 1946, Serial No. 717,312

23 Claims. (Cl. 23—14)

This invention relates to methods of making aluminum-containing hydrides and the reactions thereof, and also relates to products prepared by said methods.

We have discovered that these compounds, especially the ether soluble lithium aluminum hydride, are extremely useful chemical reagents. They may be employed for replacing halogens or organic radicals by hydrogen in a great variety of compounds. As a result, their discovery has led to new methods, safer, more convenient, and more efficient than those hitherto known, for producing hydrides of other elements or for producing derivatives of such hydrides, as well as for reducing certain types of organic halides to the corresponding hydrocarbons. Furthermore, these aluminum-containing hydrides are strong reducing agents and have been effectively used in reducing a great variety of organic compounds. Examples are the reduction of carbon dioxide to derivatives of formaldehyde, of esters to alcohols or aldehydes, of nitro compounds to azo compounds, of nitriles to amines, and the like. In many instances these reductions are more efficiently and conveniently carried out than with hitherto used reducing agents. A particular advantage of the aluminum-containing hydrogen compounds is the specificity of their reactions; thus, in general they reduce functional groups, such as the carbonyl, nitro, and other reducible groups, of compounds containing an unsaturated carbon to carbon linkage without attacking the carbon to carbon link.

The new hydrides include a new aluminum hydride-ether complex, alkali metal aluminum hydrides, and alkaline earth metal aluminum hydrides. In general, the new method comprises reacting an aluminum halide with an alkali metal hydride or an alkaline earth metal hydride. The alkali metal and alkaline earth metal aluminum hydrides have the formula $M(AlH_4)_v$ wherein M is an alkali metal or an alkaline earth metal and $v$ is either 1 or 2, a number designating the valence of the metal.

One of the most important of the new hydrides is lithium aluminum hydride having the formula $LiAlH_4$. Although this new compound will be called lithium aluminum hydride in the present application, it may also be called lithium aluminohydride or lithium tetrahydroaluminide. In one method of making lithium aluminum hydride, lithium hydride is reacted with an aluminum halide such as aluminum chloride in the presence of a suitable liquid medium such as an ether. If the reagents are mixed in the proportions of the following equation, or if an excess of lithium hydride is used, the reaction proceeds as follows:

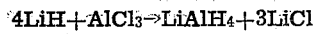

$$4LiH + AlCl_3 \rightarrow LiAlH_4 + 3LiCl$$

The liquid medium used is one in which one of the reaction products, e. g., the lithium chloride is insoluble, and the other, e. g., lithium aluminum hydride, is soluble or vice versa. This provides easy separation of the reaction products. The preferred liquid is an ether as in the ether the lithium aluminum hydride is soluble while the lithium chloride is not. After removing the insoluble materials, the solvent is removed by evaporation leaving the solid lithium aluminum hydride. The solvent may be evaporated first at ordinary temperatures and pressures and finally at higher temperatures under reduced pressures. In this reaction three gram equivalents of aluminum chloride are reacted with four gram equivalents of lithium hydride. The term "gram equivalent" means the quotient of the gram molecular weight of the compound by the product of the valences of the ions of the compound.

In carrying out the above reaction, the two solids may first be mixed with each other in a suitable apparatus and the liquid solvent then added. In an alternate procedure, the solid lithium hydride may be introduced into the reaction vessel and then the aluminum chloride may be added, preferably as a solution in the liquid to be used. This latter is the preferred procedure. It is also preferred that the air be displaced from the reaction vessel by an inert gas such as dry nitrogen. This is not essential, however, since the reaction has been carried out in air of ordinary humidity.

When the reacting materials are mixed, the mixture usually becomes warm. Ordinarily, however, this incipient reaction soon stops or becomes too slow to be readily appreciable. After an induction period, which may be only a few minutes in length or may last for several hours, the reaction again sets in, usually with such vigor that cooling of the mixture is necessary. This induction period is undesirable for several reasons. In the first place, it is difficult or impossible to foretell when the vigorous reaction will begin. It is therefore necessary that the reaction mixture be closely watched in order that the cooling may be begun before the reaction has become too vigorous for safety. It has been found that the induction period may be eliminated by adding to the lithium hydride a relatively small amount of previously prepared lithium aluminum hydride, preferably dissolved in the liquid that is used in the reactions. When this is done, the reaction proceeds smoothly on addition of the aluminum halide. Under these conditions, the rate of reaction may be conveniently controlled by controlling the rate of addition of the aluminum halide, which is preferably added in the form of a solution. Among the preferred solvents are the ethers such as diethyl ether, dibutyl ether, dioxane, and any other liquid ether non-reactive toward lithium aluminum hydride. For best results, the liquid used should be anhydrous and the aluminum halide should be reasonably free from hydrogen halide. In all of the operations, moisture should be excluded although it is not necessary to work under absolutely anhydrous conditions. The alkali metal and alkaline earth metal hydrides that are used should be of good quality. It is preferred that each of these materials be used in a finely powdered condition, preferably between 100 and 200 mesh.

Although it is preferred that a solvent such as an ether be used, this is not absolutely necessary. The aluminum halide and the hydride may be reacted in the absence of a liquid, but the reaction is sometimes difficult to control.

Aluminum hydride is closely related to the lithium aluminum hydride in its chemical properties. Aluminum hydride may be prepared by reacting aluminum halides with either lithium hydride or lithium aluminum hydride. Any similar hydride of an alkali metal or an alkaline earth metal may be used in place of the lithium compound in producing the aluminum hydride. When the reagents are mixed in the proper proportions the reaction of aluminum chloride and lithium hydride proceeds as follows:

$$3LiH + AlCl_3 \rightarrow 3LiCl + AlH_3$$

The reaction between aluminum chloride and lithium aluminum hydride proceeds according to the following:

$$3LiAlH_4 + AlCl_3 \rightarrow LiCl + 4AlH_3$$

As can be seen, it is not necessary separately to prepare lithium aluminum hydride as the reaction may be controlled so that it occurs only as an intermediate product with the reaction continuing to produce lithium chloride. The above reactions are preferably carried out in the presence of a liquid solvent such as ether. Most of the ether may be removed from the aluminum hydride by evaporation. It is impossible, however, to remove all of the ether by evaporation without decomposing the hydride. If the ether is removed at room temperature without extensive evacuation, the solid product has a composition approximating the formula $2AlH_3 \cdot O(C_2H_5)_2$. Its composition, however, depends on the time and temperature during ether removal. Thus by heating the solid at 90° C. in vacuo for several hours, the composition may reach proportions corresponding to $6AlH_3 \cdot O(C_2H_5)_2$. Irrespective of its composition, the solid is not appreciably soluble in ether. Nevertheless, either the original solution of aluminum hydride or the ether insoluble solids may be used in place of lithium aluminum hydride.

As can be seen from the first and second equations set out herein, lithium hydride and aluminum chloride may be reacted together to form either lithium aluminum hydride or aluminum hydride. The final product is determined by the proportions of the reacting materials. Thus, to prepare lithium aluminum hydride four moles or more of lithium hydride are reacted per mole of aluminum chloride. If the final product is to be aluminum hydride only three moles of lithium hydride are reacted per mole of aluminum chloride. As has been pointed out above, it is possible to use aluminum halides other than the chloride. It is also possible to use hydrides of alkali metals other than lithium, or hydrides of the alkaline earth metals.

The new compound lithium aluminum hydride is a white solid that is stable in dry air at room temperature. It may be heated without appreciable decomposition to temperatures below 100° C. in a vacuum. Above 100° C., it decomposes slowly, but the rate of decomposition increases with rise in temperature. At 150° C., the decomposition can be observed by color changes after a relatively short time. The products of decomposition are lithium hydride, aluminum, and hydrogen. The new compound is soluble in diethyl ether to the extent of about 25 grams per 100 grams solvent. It is also soluble in other ethers. The new compound reacts with water to give hydrogen, and either lithium hydroxide and aluminum hydroxide, or lithium aluminate. This reaction is quite rapid. In spite of this, the compound does not decompose very rapidly on exposure to air of even fairly high humidity. It is believed that this is true because the solid becomes coated with a protective layer of reaction product.

The new compounds have many important properties. Through their use, hydrogen atoms may be caused to replace halogen and other atoms as well as groups such as alkyl groups. Thus new methods are possible for preparing hydrogen compounds. An example is represented by the generalized equation:

$$(4-x)LiAlH_4 + 4SiR_xCl_{4-x} \rightarrow$$
$$(4-x)LiCl + (4-x)AlCl_3 + 4SiR_xH_{4-x}$$

in which $x$ may vary from 0 to 3 and R is an alkyl or aryl group. Examples of silicon hydrides thus obtained are: silicon hydrides, methyl silicon hydrides, ethyl silicon hydrides, propyl silicon hydrides, monophenyl silicon hydrides, diethyl silicon hydrides, dibutyl silicon hydrides, and many others of similar nature. Similar reactions occur with compounds of elements other than silicon. These include germanium, tin, arsenic, antimony, and the like.

In addition to providing improved methods of preparing hydrogen compounds, the new materials may also be used to prepare hitherto unknown compounds such as zinc hydride. Here the alkyl group of a zinc-alkyl compound is replaced by hydrogen. In similar reactions, the hydrides of beryllium and aluminum may be prepared.

Another significant property of the new compounds is their ability to reduce organic compounds difficult to reduce effectively by hitherto known methods. Examples of such reductions are the reduction of carbon dioxide to derivatives of formaldehyde, and of aryl nitro compounds directly and completely to azo compounds. Aliphatic nitro compounds are converted to amines. Other reductions such as those of esters, aldehydes, ketones, and acid chlorides to alcohols, and of nitriles to amines, are more efficiently achieved by the new compounds than by other reducing agents. In such reductions by the new reagents, the functional groups are reacted but unsaturated carbon to carbon links are not attacked. This is a very important feature of the new materials. In some few chemical compounds there may be double bonds that will be attacked, but ordinarily they will not be. For example, when the reaction is between nitro-styrene and one of the new reagents, a double bond will be attacked.

The above application reactions occur in ether, or other solvent, solutions either at room or elevated temperatures. Where elevated temperatures are desired suitable high boiling solvents are employed.

In a typical embodiment of the method of making lithium aluminum hydride, 0.02 mole of anhydrous aluminum chloride was mixed with 0.50 mole of lithium hydride under dry nitrogen in a flask. The flask was then attached through a standard taper to a vacuum system and evacuated. 15 c. c. of anhydrous diethyl ether were distilled into the flask by condensing the ether in with liquid nitrogen. The mixture was warmed until a reaction occurred. The reaction was allowed to proceed vigorously, but was kept under control by cooling the flask with liquid nitrogen from time to time. The total reaction time was approximately five minutes. When the reaction was thus carried out in the vacuum, no induction period occurred.

In another example of making lithium aluminum hydride, a reaction vessel was used having three necks to which were attached a mercury sealed stirrer, a dropping funnel, and a bulb condenser. The open ends of the condenser and the funnel were protected from moisture by calcium chloride drying tubes. The reaction vessel and its attachments were dried and flushed with dry nitrogen. Into the flask was placed 25 c. c. of a solution containing 10 grams of lithium aluminum hydride per 100 grams of diethyl ether. 30 grams of lithium hydride were dropped into the solution and the mixture was stirred for a short time. Through the dropping funnel a solution of 100 grams of aluminum chloride and 500 c. c. of diethyl ether was added slowly with continuous stirring. The addition rate was so controlled that the boiling in the reaction vessel was kept constant, thus showing a smooth reaction. Stirring was continued for a short time after the addition of aluminum chloride was finished and until the reaction appeared to cease. The reaction product was filtered through a sintered glass disk under a pressure of dry nitrogen to remove the lithium chloride and the excess of lithium hydride. The ether was distilled from the filtrate at atmospheric pressure until a thick syrup was formed. The last of the ether was removed under vacuum and by heating the product at about 70° C. In general, the yields were from 85 to 90% of the theoretical and the purity varied from 93 to 98%.

In the procedure just described, a small amount of lithium aluminum hydride was added to the reaction mixture to avoid the induction period. When lithium aluminum hydride is not available for this purpose, a procedure in all respects like that described above, except that dioxane is used in place of diethyl ether and that the reflux temperature is higher, may be employed with relatively small quantities of the reagent. The solid product resulting from the removal of the dioxane from the filtered solution may then be used to start the reaction in the procedure described above. In carrying out this procedure, it is preferred that a small amount of diethyl ether be added before filtering the reaction mixture. This is done because the lithium aluminum hydride is more soluble in diethyl ether than in dioxane.

In a typical preparation of aluminum hydride from lithium hydride according to the following reaction:

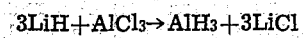

$$3LiH + AlCl_3 \rightarrow AlH_3 + 3LiCl$$

a solution of 33.00 g. (0.248 mole) of aluminum chloride in 70 g. of anhydrous diethyl ether was added during a 20 minute period to a nitrogen filled reaction vessel containing a mixture of 5.90 g. (0.743 mole) of lithium hydride, 0.3 g. of lithium aluminum hydride, and 240 g. of ether. (It is to be noted that the relative quantity of aluminum chloride was as nearly as possible that demanded by the equation, and that a relatively large amount of ether was used.) The reaction mixture was stirred for one hour after completing the addition of aluminum chloride. The precipitated lithium chloride was removed by passing the solution through a sintered glass disk. The solution was analyzed and found to contain approximately 6.3 g. (0.21 mole) of aluminum hydride, or about 85% of the theoretical.

In preparing aluminum hydride from lithium aluminum hydride according to the following reaction:

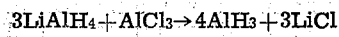

$$3LiAlH_4 + AlCl_3 \rightarrow 4AlH_3 + 3LiCl$$

a solution of 0.547 g. (0.0144 mole) of lithium aluminum hydride in 9.10 g. of anhydrous diethyl ether was placed in a reaction vessel which had been flushed out with nitrogen. To the solution, after further addition of 15 g. of ether, 0.629 g. (0.00472 mole) of anhydrous aluminum chloride was added. A vigorous reaction occurred, but soon subsided. The precipitated lithium chloride was removed from the solution by filtration, and the ether was evaporated from the filtrate under vacuum conditions, leaving a white, non-volatile solid. The latter was slowly heated in vacuo to about 96° C. at which temperature a small amount of hydrogen was evolved and the white solid started to turn grey. The flask was immediately cooled. The resulting material had a composition corresponding to the formula 4.5 $AlH_3 \cdot O(C_2H_5)_2$ and the quantity obtained represented a 92% yield of aluminum hydride.

Having described our invention in considerable detail, it is our intention that the invention be not limited by any of the details of description unless otherwise specified, but rather be construed broadly within its spirit and scope as set out in the accompanying claims.

We claim:

1. The method of making a member of the class consisting of an ether complex of aluminum hydride and a member of the class consisting of alkali metal and alkaline earth metal aluminum hydrides, which comprises reacting an aluminum halide with a member of the class consisting of alkali metal and alkaline earth metal hydrides in the presence of an aliphatic ether.

2. The method of claim 1 wherein the reacting hydrides are in a finely-divided condition comprising particles of 100 to 200 mesh.

3. The method of claim 1 wherein the reaction takes place in a liquid in which the resulting hydride is soluble but the other reaction products are not.

4. The method of making a member of the class consisting of alkali metal and alkaline earth metal aluminum hydrides which comprises reacting three gram equivalents of an aluminum halide with at least four gram equivalents of a member of the class consisting of alkali metal and alkaline earth metal hydrides.

5. The method of making an ether complex of aluminum hydride which comprises reacting three gram equivalents of an aluminum halide with three gram equivalents of a member of the class consisting of alkali metal and alkaline earth metal hydrides in the presence of an aliphatic ether.

6. The new compounds: $M(AlH_4)_v$ wherein M is a metal of the class consisting of alkali metals and alkaline earth metals and $v$ is a number designating the valence of said metal, said compound being a solid in its substantially pure form and strongly reactive with water and alcohol to evolve hydrogen and being stable at room temperature.

7. The new compound: $LiAlH_4$, which in its substantially pure form is a substantially white solid, strongly reactive with water and alcohol to evolve hydrogen and stable at room temperature.

8. The new compound: a complex of aluminum hydride and an aliphatic ether.

9. The method of preparing a compound containing an $AlH_4$ group in conjunction with a metal of the class consisting of alkali metals and alkaline earth metals which comprises reacting an aluminum halide with a member of the class consisting of alkali metal and alkaline earth metal hydrides.

10. The method of claim 9 wherein the reaction takes place in the presence of an aliphatic ether.

11. The method of claim 9 wherein the aluminum halide is aluminum chloride.

12. The method of claim 9 wherein the reaction takes place in the presence of a solvent in which one of the reaction products is soluble.

13. The method of preparing $LiAlH_4$ which comprises reacting lithium hydride with an aluminum halide.

14. The method of claim 13 wherein the aluminum halide is aluminum chloride.

15. The method of claim 13 wherein the reaction takes place in the presence of a solvent in which one of the reaction products is soluble.

16. The method of claim 13 wherein the reaction takes place in the presence of an aliphatic ether.

17. The method of claim 13 wherein the reaction takes place in the presence of diethyl ether.

18. The method of preparing $LiAlH_4$ which comprises mixing a solution of an aliphatic ether and an ether soluble aluminum compound with lithium hydride.

19. The method of preparing $LiAlH_4$ which comprises mixing a solution of an aliphatic ether and an ether soluble aluminum compound with a suspension of lithium hydride in ether.

20. In the preparation of $LiAlH_4$ by reacting a mixture of lithium hydride with an aluminum compound, the method which comprises first raising the temperature of the mixture and then cooling it after the reaction has begun.

21. In the preparation of $LiAlH_4$ by reacting a mixture of lithium hydride with an aluminum compound, the method which comprises adding to the mixture a small amount of previously prepared $LiAlH_4$.

22. In the preparation of $LiAlH_4$, the method which comprises suspending lithium hydride in a solution of a small amount of previously prepared $LiAlH_4$ in an aliphatic ether, mixing therewith a solution of an aliphatic ether and an ether soluble aluminum compound, and agitating the mixture, said solution of the aluminum compound being mixed with the lithium hydride suspension at a rate to prevent undue temperature rise and undue acceleration of the reaction.

23. The method of making the double hydride of lithium and aluminum $LiAlH_4$, which comprises reacting an aluminum halide with lithium hydride in a reaction medium comprising an aliphatic ether and recovering the double hydride in solution in said ether.

HERMANN I. SCHLESINGER.
ALBERT E. FINHOLT.

REFERENCES CITED

The following references are of record in the file of this patent:

UNITED STATES PATENTS

| Number | Name | Date |
| --- | --- | --- |
| 1,796,265 | Frendenberg et al. | Mar. 10, 1931 |
| 1,958,012 | Muckenfuss | May 8, 1934 |
| 1,971,742 | Bertsch | Aug. 28, 1934 |
| 2,067,748 | Zimmermann | Jan. 12, 1937 |
| 2,113,353 | McKenna | Apr. 5, 1938 |
| 2,344,244 | Freed et al. | Mar. 14, 1944 |